United States Patent [19]

Severinsson

[11] Patent Number: 4,699,256
[45] Date of Patent: Oct. 13, 1987

[54] WEDGE BRAKE ARRANGEMENT FOR HEAVY ROAD VEHICLES

[75] Inventor: Lars M. Severinsson, Hishult, Sweden

[73] Assignee: Haldex AB, Landskrona, Sweden

[21] Appl. No.: 860,041

[22] Filed: May 6, 1986

[30] Foreign Application Priority Data

May 10, 1985 [SE] Sweden .................. 8502335

[51] Int. Cl.⁴ ............................ F16D 51/22
[52] U.S. Cl. .................. 188/343; 74/110; 192/93 C
[58] Field of Search .......... 188/343; 74/110; 192/93 R, 93 C

[56] References Cited

U.S. PATENT DOCUMENTS

| 500,289 | 6/1893 | McKillip | 192/93 C X |
| 1,799,229 | 4/1931 | Hanna | 74/110 |
| 3,395,584 | 8/1968 | Cox et al. | 188/343 X |
| 3,511,103 | 5/1970 | Cox, Jr. | 188/343 |
| 3,707,845 | 1/1973 | Mitton | 74/110 X |
| 3,869,025 | 3/1975 | Oliver | 188/79.5 GE |

FOREIGN PATENT DOCUMENTS 2356075 6/1974 Fed. Rep. of Germany .
402335 4/1973 Sweden .

Primary Examiner—George E. A. Halvosa
Attorney, Agent, or Firm—Laurence R. Brown

[57] ABSTRACT

A wedge brake arrangement for drum brakes on heavy road vehicles includes a brake cylinder push rod (29), plungers (26) axially movable perpendicularly to the push rod, and force transmitting rollers (32) between parallel wedge surfaces at the end of the push rod and on the respective plunger. In order to obtain full control over the reaction forces from the plungers (26) at brake operation the push rod (29) is guided by the housing (25) of the arrangement in the plane of the plungers by means of guide rollers (35) between plane surfaces at the end of the push rod (29) and in the housing (25), respectively, the surfaces being parallel with each other and with the axis of the push rod.

4 Claims, 4 Drawing Figures 4,699,256

WEDGE BRAKE ARRANGEMENT FOR HEAVY ROAD VEHICLES

TECHNICAL FIELD

This invention relates to a wedge brake arrangement, especially for heavy road vehicles, including a brake cylinder push rod axially movable in a housing, plungers axially movable in the housing substantially perpendicularly to the push rod, and force transmitting rollers between parallel wedge surfaces at the end of the push rod and on the respective plunger, so that the plungers are pushed apart at the axial movement of the push rod.

BACKGROUND OF THE INVENTION

Arrangements of the kind referred to are well known in the art. The plungers are intended for cooperation with the ends of brake shoes brakingly engaging a rotating brake drum of the vehicle. Numerous examples from the patent literature could be given; just one and rather typical example is DE-B-23 56 075.

A well known drawback with presently known wedge brakes of the above mentioned type is the uneven distribution of brake forces and brake lining wear resulting from the facts that—depending on the direction of rotation for the wheel to be braked—one of the brake shoes is "leading" and the other one "trailing" and that the wedge brake arrangement as described is "floating" and is unable to control the proper distribution of the forces to the respective brake shoe.

THE INVENTION

This basic drawback with presently known wedge brake arrangements is according to the invention eliminated and a compact, cheap and reliable design is obtained in that the push rod is guided by the housing in the plane of the plungers—for complete control over the reaction forces from the plungers—by means of guide rollers, arranged between plane surfaces at the end of the push rod and in the housing, respectively, the surfaces being parallel with each other and with the axis of the push rod.

In this design a guide roller is preferably arranged on either side of the force transmitting roller.

It is common to provide a roller cage for the proper guiding of the force transmitting rollers in conventional designs. In the design according to the invention both the guide rollers and the force transmitting rollers are arranged in suitably shaped openings in the roller cage.

The reaction forces in the arrangement are substantial, and a long life with safe operation is essential, which means that all the mentioned surfaces and rollers have to be strong and highly wear-resistant. In order not to use too high quality for the material in the whole housing a separate, high-quality reaction plate is arranged in the housing on either side of the push rod to serve as the plane surface for the guide rollers in the housing.

BRIEF DESCRIPTION OF THE DRAWINGS

The invention will be described in further detail below reference being made to the accompanying drawings, in which.

DETAILED DESCRIPTION OF PREFERRED EMBODIMENTS

Figure 1:
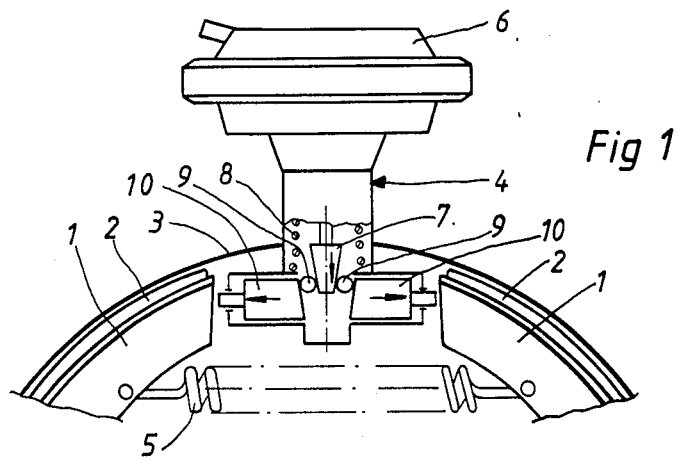
FIG. 1 is a schematic side view, partly in section, of the wedge brake arrangement according to the state of the art.

A typical conventional wedge brake arrangement as presently used for heavy road vehicles is shown in FIG. 1. Brake shoes 1 provided with brake linings 2 are movable into braking engagement with a brake drum 3, rotating with a wheel (not shown) of the vehicle, by means of a so called wedge brake unit 4, whereas the return movement of the shoes is performed by a draw spring 5.

The wedge brake unit 4 includes a brake fluid operated brake cylinder 6, whose outgoing push rod is in the form of a wedge 7. There is a return spring 8 of the helical compression type for the push rod. Rollers 8 are arranged between the wedge 7 and plungers 10 axially movable substantially perpendicularly to the wedge 7 so as to push the brake shoes 1 into braking engagement with the brake drum 3. The inclination of the plunger ends cooperating with the rollers 9 is the same as that of the respective surface of the wedge 7, so that the rollers 9 roll between parallel surfaces. In practical embodiments the rollers 9 are provided with roller cages or similar guiding means, which for the sake of simplicity are not shown in FIG. 1.

Depending on the direction of rotation for the brake drum 3 one of the brake shoes 1 will be "leading", whereas the other one will be "trailing", when the two plungers 10 are pressed apart by the wedge 7 via the rollers 9 for performing a brake operation. This means that the arrangement can be characterized as "floating" and that no control over the force transmission to the respective brake shoe is attained, resulting for example in uneven distribution of the brake force and of the brake lining wear.

Figure 2:
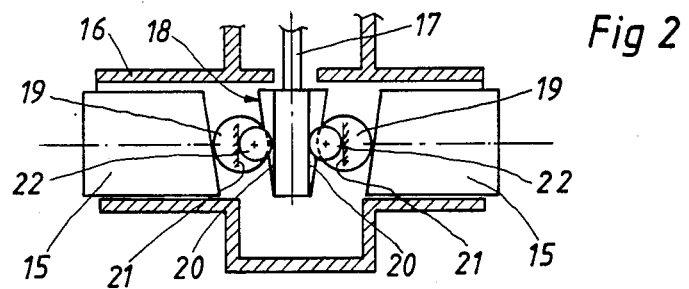
FIG. 2 is a corresponding, but enlarged side view illustrates the principle of the invention.

A principally different solution according to the invention is illustrated in FIG. 2, where only those parts of the general arrangement according to FIG. 1 which are of interest for a proper understanding of the invention are shown.

As in the conventional arrangement two plungers 15 are axially movable in a housing 16. A brake cylinder push rod 17 is axially movable perpendicularly to the plungers 15. The push rod 17 is provided with a wedge 18, and force transmitting rollers 19 are arranged between the respective wedge surface and an end surface of the plunger 15 parallel therewith, giving the function described above with reference to FIG. 1.

However, the wedge 18 is also provided with surfaces 20 parallel with each other and with the axis of the push rod 17, and corresponding parallel guide surfaces 21 are fixedly arranged in the housing 16 in any suitable way. Guide rollers 22 are arranged between these surfaces 20, 21. Obviously the rollers 19 and 22 need to be properly guided, but no means herefore, such as a roller cage or the like, are disclosed in FIG. 2.

The control lacking in the conventional arrangement according to FIG. 1 is completely obtained with the modification disclosed in FIG. 2, where the guide rollers 22 will provide the necessary control over the reaction forces in the arrangement.

Figure 3:
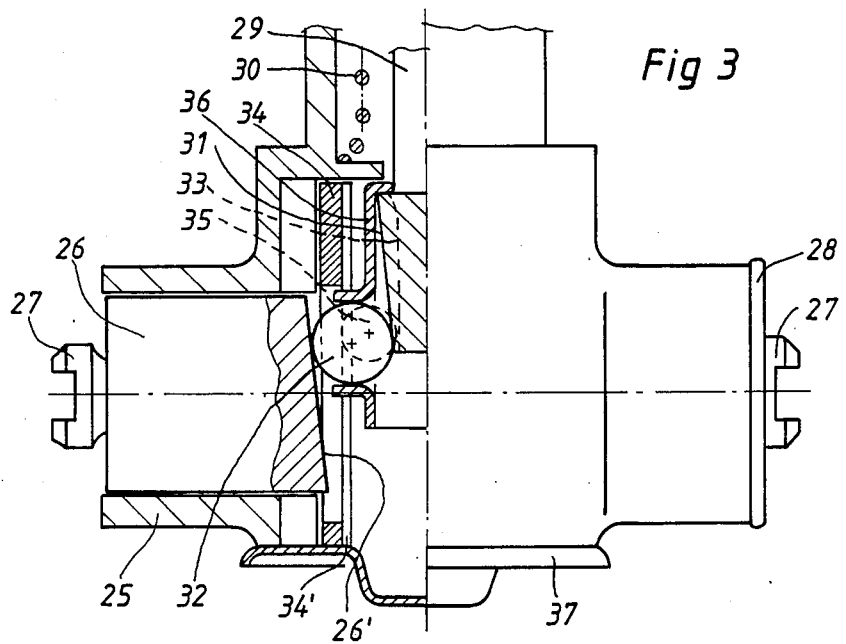
FIG. 3 is a side view to an even larger scale and partly in section of a practical embodiment of a wedge brake arrangement according to the invention.
Figure 4:
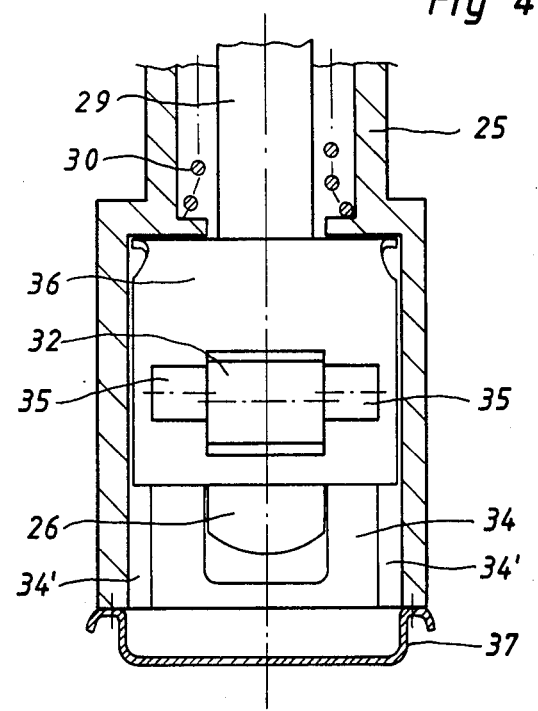
FIG. 4 is a section perpendicularly through FIG. 3 in a convenient location to show the interaction of the different details.

A practical embodiment of an arrangement of the modified kind disclosed in FIG. 2 is shown in FIGS. 3 and 4. In FIG. 3 only the left half of the arrangement is sectioned, but the contents of the right half is the same as that shown.

In a housing 25 a plunger 26 is axially movable. At its end extending out of the housing 25 the plunger 26 is provided with a member 27 for engaging the respective brake shoe (cf FIG. 1). A bellows 28 (only shown to the right in FIG. 3) between the housing 25 and the member 27 prevents moisture, dirt and the like from entering the housing 25. Only a smaller part of the plunger 26 is sectioned; conventionally a slack adjuster is provided therein but forms no part of the invention and is not disclosed or described. In order to take full advantage of the arrangement according to the invention the two slack adjusters in the plungers 26 need to be synchronized in a way not shown.

A brake cylinder push rod 29 is axially movable in the housing 25 perpendicularly to the plunger 26. A return spring 30 of the helical compression type is provided for the push rod 29. At the end of the push rod 29 there is a central wedge surface 31 cooperating with a force transmitting roller 32, in turn cooperating with a plunger end surface 26' parallel with the wedge surface 31.

On either side of the wedge surface 31 at the end of the push rod 29 is a guide surface 33 parallel with the axis of the push rod 29. A hardened reaction plate 34 is arranged in the housing 25 in parallel with the guide surfaces 33, and a guide roller 35 is arranged between the guide surface 33 and the reaction plate 34. A certain guiding for the guide roller 35 is provided by a small flange 34' on the reaction plate 34 or by the housing 25.

A roller cage 36 provides the necessary guiding for the three rollers 32 and 35 at either side of the push rod 29. A cover 37 is attached to the bottom of the housing 25.

The arrangement for the proper guiding of the push rod in the plane of the plungers as shown and described is preferred as the most suitable under the circumstances, but many other practical solutions are conceivable.

All the way through this specification the expression "push rod" has been used as the means for introducing a brake force from a brake cylinder. However, it is well known to any person skilled in the art that is an easy task to modify any arrangement of this kind to include a "pull rod" as a modification, which is intended to be included in the scope of the claims below. Also other means than the rollers 32 and 35 for transmitting the forces are conceivable, for example pinions between rack-shaped surfaces.

A perpendicular force transmission between the push rod and the plungers has been presumed, but deviations from the exact perpendicularity are possible.

What is claimed is:

1. A wedge brake arrangement, especially for heavy road vehicles, comprising in combination, a brake cylinder push rod having an axis and axially movable in a housing, plungers having axes and axially movable in the housing substantially perpendicularly to the push road axis, opposed parallel wedge surfaces disposed on the push rod and on the respective plungers, force transmitting rollers positioned between said opposed parallel wedge surfaces for pushing the plungers apart in response to axial movement of the push rod, push rod guide means for axially guiding the push rod for movement within the housing for complete control over the reaction forces from the plungers, said push rod guide means including plane guide surfaces, disposed on the push rod and opposed plane guide surfaces carried in the housing, the guide surfaces being parallel with each other and with the axis of the push rod, and guide roller means disposed between opposed guide surfaces for rolling contact therewith, said guide roller means positioned on the same side of the plungers as the force transmitting rollers.

2. An arrangement according to claim 1, wherein the push rod has guide rollers arranged on opposite sides of the force transmitting roller.

3. An arrangement according to claim 2, including a roller cage positioned between the push rod and a plunger, and wherein the guide rollers and force transmitting rollers are arranged in suitably shaped openings in the roller cage for guiding the rollers.

4. An arrangement according to claim 2, wherein the guide surfaces carried in the housing are defined by a reaction plate disposed in the housing between the push rod and a plunger.

* * * * *